US012739131B1

(12) United States Patent
Dunn et al.

(10) Patent No.: US 12,739,131 B1
(45) Date of Patent: Sep. 15, 2026

(54) VIDEO FILES WITH EMBEDDED DIGITAL SIGNATURES FOR DATA SECURITY AND AUTHENTICATION, RELATED SYSTEMS AND METHODS

(71) Applicant: Manufacturing Resources International, Inc., Alpharetta, GA (US)

(72) Inventors: William Dunn, Alpharetta, GA (US); Douglas Bennett, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 19/027,695

(22) Filed: Jan. 17, 2025

Related U.S. Application Data

(60) Provisional application No. 63/549,012, filed on Feb. 2, 2024.

(51) Int. Cl.
*H04L 9/40* (2022.01)
*H04L 9/32* (2006.01)

(52) U.S. Cl.
CPC .................................. *H04L 9/3247* (2013.01)

(58) Field of Classification Search
CPC ..................................................... H04L 9/3247
See application file for complete search history.

(56) References Cited

U.S. PATENT DOCUMENTS 4,271,410 A 6/1981 Crawford
4,399,456 A 8/1983 Zalm
4,456,910 A 6/1984 DiMassimo et al.
4,571,616 A 2/1986 Haisma et al.
4,593,978 A 6/1986 Mourey et al.
4,753,519 A 6/1988 Miyatake
5,029,982 A 7/1991 Nash
5,049,987 A 9/1991 Hoppenstein
5,081,523 A 1/1992 Frazier
5,088,806 A 2/1992 McCartney et al.
5,093,654 A 3/1992 Swift et al.

(Continued)

FOREIGN PATENT DOCUMENTS

CN 101777315 A 7/2010
CN 102246196 A 11/2011

(Continued)

OTHER PUBLICATIONS

AMS AG, TCS3404, TCS3414, Digital Color Sensors, Apr. 2011, 41 pages, Texas Advanced Optoelectronic Solutions Inc. is now ams AG.

(Continued)

*Primary Examiner* — Ghodrat Jamshidi

(74) *Attorney, Agent, or Firm* — Standley Law Group LLP; Jeffrey S. Standley; Adam J. Smith

(57) ABSTRACT

Display assemblies with data security and authentication features, along with related systems and methods are provided. The display assembly includes a processing device in electronic communication with a media player and an electronic display. The processing device checks for a valid digital signature in files received from the media player for playing at the electronic display. Only if the valid digital signature is found will the processing device allow the received video file to be played at the electronic display.

18 Claims, 2 Drawing Sheets

(56) References Cited

U.S. PATENT DOCUMENTS 5,115,229 A 5/1992 Shalit
5,162,645 A 11/1992 Wagensonner et al.
5,162,785 A 11/1992 Fagard
5,351,201 A 9/1994 Harshbarger, Jr. et al.
5,402,141 A 3/1995 Haim et al.
5,565,894 A 10/1996 Bates et al.
5,656,824 A 8/1997 den Boer et al.
5,663,952 A 9/1997 Gentry, Jr.
5,694,141 A 12/1997 Chee
5,751,346 A 5/1998 Dozier et al.
5,835,074 A 11/1998 Didier et al.
5,850,449 A * 12/1998 McManis .............. H04L 63/126 718/1
5,872,593 A 2/1999 Kawashima
5,886,731 A 3/1999 Ebisawa
5,912,743 A 6/1999 Kinebuchi et al.
6,027,222 A 2/2000 Oki et al.
6,032,126 A 2/2000 Kaehler
6,055,012 A 4/2000 Haskell et al.
6,075,556 A 6/2000 Urano et al.
6,091,777 A 7/2000 Guetz et al.
6,094,457 A 7/2000 Linzer et al.
6,100,906 A 8/2000 Asaro et al.
6,153,985 A 11/2000 Grossman
6,259,492 B1 7/2001 Imoto et al.
6,292,157 B1 9/2001 Greene et al.
6,292,228 B1 9/2001 Cho
6,297,859 B1 10/2001 George
6,326,934 B1 12/2001 Kinzie
6,359,390 B1 3/2002 Nagai
6,392,727 B1 5/2002 Larson et al.
6,417,900 B1 7/2002 Shin et al.
6,421,103 B2 7/2002 Yamaguchi
6,421,694 B1 7/2002 Nawaz et al.
6,428,198 B1 8/2002 Saccomanno et al.
6,536,041 B1 3/2003 Knudson et al.
6,546,294 B1 4/2003 Kelsey et al.
6,553,336 B1 4/2003 Johnson et al.
6,587,525 B2 7/2003 Jeong et al.
6,642,666 B1 11/2003 St-Germain
6,674,463 B1 1/2004 Just et al.
6,690,726 B1 2/2004 Yavits et al.
6,697,100 B2 2/2004 Tatsuzawa
6,698,020 B1 2/2004 Zigmond et al.
6,701,143 B1 3/2004 Dukach et al.
6,712,046 B2 3/2004 Nakamichi
6,812,851 B1 11/2004 Dukach et al.
6,820,050 B2 11/2004 Simmon et al.
6,825,899 B2 11/2004 Kobayashi
6,859,215 B1 2/2005 Brown et al.
6,996,460 B1 2/2006 Krahnstoever et al.
7,057,590 B2 6/2006 Lim et al.
7,103,852 B2 9/2006 Kairis, Jr.
7,136,415 B2 11/2006 Yun et al.
7,174,029 B2 2/2007 Agostinelli et al.
7,304,638 B2 12/2007 Murphy
7,307,614 B2 12/2007 Vinn
7,319,862 B1 1/2008 Lincoln et al.
7,358,851 B2 4/2008 Patenaude et al.
7,385,593 B2 6/2008 Krajewski et al.
7,391,811 B2 6/2008 Itoi et al.
7,480,042 B1 1/2009 Phillips et al.
7,518,600 B2 4/2009 Lee
7,519,703 B1 4/2009 Stuart et al.
7,573,458 B2 8/2009 Dunn
7,581,094 B1 8/2009 Apostolopoulos et al.
7,669,757 B1 3/2010 Crews et al.
7,764,280 B2 7/2010 Shiina
7,810,114 B2 10/2010 Flickinger et al.
7,825,991 B2 11/2010 Enomoto
7,937,724 B2 5/2011 Clark et al.
7,988,849 B2 8/2011 Biewer et al.
8,130,836 B2 3/2012 Ha
8,212,921 B2 7/2012 Yun
8,218,812 B2 7/2012 Sugimoto et al.
8,242,974 B2 8/2012 Yamazaki et al.
8,400,570 B2 3/2013 Dunn et al.
8,417,376 B1 4/2013 Smolen
8,441,574 B2 5/2013 Dunn et al.
8,544,033 B1 9/2013 Acharya et al.
8,689,343 B2 4/2014 De Laet
8,745,206 B1 6/2014 Chang et al.
8,766,893 B2 7/2014 Wang
8,823,630 B2 9/2014 Roberts et al.
8,989,718 B2 3/2015 Ramer et al.
9,026,686 B2 5/2015 Dunn et al.
9,031,872 B1 5/2015 Foster
9,141,329 B1 9/2015 Reicher et al.
9,147,194 B1 9/2015 Le et al.
9,465,923 B2 10/2016 Shen
9,582,157 B1 2/2017 Chatterjee et al.
10,068,237 B2 9/2018 Simske et al.
10,185,969 B1 1/2019 Holloway et al.
10,225,718 B2 3/2019 Kim et al.
10,304,417 B2 5/2019 Park et al.
11,088,772 B1 8/2021 Wright et al.
11,588,889 B1 2/2023 Sendurpandian et al.
11,711,555 B1 * 7/2023 Sendurpandian ..... H04L 9/0861 725/31
2001/0019454 A1 9/2001 Tadic-Galeb et al.
2002/0009978 A1 1/2002 Dukach et al.
2002/0013144 A1 1/2002 Waters et al.
2002/0018522 A1 2/2002 Wiedenmann
2002/0026354 A1 2/2002 Shoji et al.
2002/0065046 A1 5/2002 Mankins et al.
2002/0084891 A1 7/2002 Mankins et al.
2002/0112026 A1 8/2002 Fridman et al.
2002/0112162 A1 * 8/2002 Cocotis ................ H04L 63/123 713/176
2002/0118320 A1 8/2002 Bayrle et al.
2002/0120721 A1 8/2002 Eilers et al.
2002/0147648 A1 10/2002 Fadden et al.
2002/0154138 A1 10/2002 Wada et al.
2002/0163513 A1 11/2002 Tsuji
2002/0164962 A1 11/2002 Mankins et al.
2002/0190972 A1 12/2002 Ven de Van
2002/0194365 A1 12/2002 Jammes
2002/0194609 A1 12/2002 Tran
2003/0030733 A1 2/2003 Seaman et al.
2003/0031128 A1 2/2003 Kim et al.
2003/0039312 A1 2/2003 Horowitz et al.
2003/0061316 A1 3/2003 Blair et al.
2003/0098881 A1 5/2003 Nolte et al.
2003/0115591 A1 6/2003 Weissmueller, Jr. et al.
2003/0117428 A1 6/2003 Li et al.
2003/0125892 A1 7/2003 Edge
2003/0160734 A1 8/2003 Rogers
2003/0161354 A1 8/2003 Bader et al.
2003/0177269 A1 9/2003 Robinson et al.
2003/0192060 A1 10/2003 Levy
2003/0196208 A1 10/2003 Jacobson
2003/0202605 A1 10/2003 Hazra et al.
2003/0227428 A1 12/2003 Nose
2004/0012722 A1 1/2004 Alvarez
2004/0036622 A1 2/2004 Dukach et al.
2004/0114041 A1 6/2004 Doyle et al.
2004/0136698 A1 7/2004 Mock
2004/0138840 A1 7/2004 Wolfe
2004/0194131 A1 9/2004 Ellis et al.
2004/0207738 A1 10/2004 Wacker
2004/0252187 A1 12/2004 Alden
2005/0005302 A1 1/2005 Zigmond et al.
2005/0012734 A1 1/2005 Johnson et al.
2005/0046951 A1 3/2005 Sugihara et al.
2005/0071252 A1 3/2005 Henning et al.
2005/0123001 A1 6/2005 Craven et al.
2005/0127796 A1 6/2005 Olesen et al.
2005/0134525 A1 6/2005 Tanghe et al.
2005/0134526 A1 6/2005 Willem et al.
2005/0184983 A1 8/2005 Brabander et al.
2005/0188402 A1 8/2005 de Andrade et al.
2005/0195206 A1 9/2005 Wogsberg
2005/0195330 A1 9/2005 Zacks et al.
2005/0216939 A1 9/2005 Corbin

(56) References Cited

U.S. PATENT DOCUMENTS

2005/0253699 A1 11/2005 Madonia
2005/0289061 A1 12/2005 Kulakowski et al.
2005/0289588 A1 12/2005 Kinnear
2006/0087521 A1 4/2006 Chu et al.
2006/0150222 A1 7/2006 McCafferty et al.
2006/0160614 A1 7/2006 Walker et al.
2006/0184961 A1 8/2006 Lee et al.
2006/0214904 A1 9/2006 Kimura et al.
2006/0215044 A1 9/2006 Masuda et al.
2006/0242399 A1 10/2006 Zimmer et al.
2006/0244702 A1 11/2006 Yamazaki et al.
2007/0028111 A1* 2/2007 Covely ................. H04L 9/3247 713/176
2007/0047808 A1 3/2007 Choe et al.
2007/0089152 A1 4/2007 Patten et al.
2007/0094620 A1 4/2007 Park
2007/0120763 A1 5/2007 De Paepe et al.
2007/0127569 A1 6/2007 Hatalker
2007/0152949 A1 7/2007 Sakai
2007/0157260 A1 7/2007 Walker
2007/0164932 A1 7/2007 Moon
2007/0165955 A1 7/2007 Hwang et al.
2007/0168539 A1 7/2007 Day
2007/0200513 A1 8/2007 Ha et al.
2007/0211179 A1 9/2007 Hector et al.
2007/0220544 A1 9/2007 Nash-Putnam
2007/0241203 A1 10/2007 Wagner et al.
2007/0247594 A1 10/2007 Tanaka
2007/0274400 A1 11/2007 Murai et al.
2007/0286107 A1 12/2007 Singh et al.
2007/0297172 A1 12/2007 Furukawa et al.
2008/0008471 A1 1/2008 Dress
2008/0017422 A1 1/2008 Carro
2008/0018584 A1 1/2008 Park et al.
2008/0028059 A1 1/2008 Shin et al.
2008/0037783 A1 2/2008 Kim et al.
2008/0055247 A1 3/2008 Boillot
2008/0074372 A1 3/2008 Baba et al.
2008/0093443 A1 4/2008 Barcelou
2008/0104631 A1 5/2008 Krock et al.
2008/0106527 A1 5/2008 Cornish et al.
2008/0112601 A1 5/2008 Warp
2008/0119237 A1 5/2008 Kim
2008/0120181 A1 5/2008 Chang et al.
2008/0143637 A1 6/2008 Sunahara et al.
2008/0158468 A1 7/2008 Kim et al.
2008/0163291 A1 7/2008 Fishman et al.
2008/0170028 A1 7/2008 Yoshida
2008/0174522 A1 7/2008 Cho et al.
2008/0180571 A1* 7/2008 Chuang .................... H04N 7/08 348/E7.001
2008/0201208 A1 8/2008 Tie et al.
2008/0231604 A1 9/2008 Peterson
2008/0232478 A1 9/2008 Teng et al.
2008/0246871 A1 10/2008 Kupper et al.
2008/0259198 A1 10/2008 Chen et al.
2008/0262914 A1 10/2008 Suveyke et al.
2008/0266331 A1 10/2008 Chen et al.
2008/0272999 A1 11/2008 Kurokawa et al.
2008/0278432 A1 11/2008 Ohshima
2008/0278455 A1 11/2008 Atkins et al.
2008/0291686 A1 11/2008 Cull et al.
2008/0303918 A1 12/2008 Keithley
2008/0313046 A1 12/2008 Denenburg et al.
2009/0003244 A1 1/2009 Matsuo
2009/0036190 A1 2/2009 Brosnan et al.
2009/0058845 A1 3/2009 Fukuda et al.
2009/0081993 A1 3/2009 Shihab
2009/0102914 A1 4/2009 Collar et al.
2009/0102973 A1 4/2009 Harris
2009/0109165 A1 4/2009 Park et al.
2009/0129556 A1 5/2009 Ahn
2009/0164615 A1 6/2009 Akkanen
2009/0182917 A1 7/2009 Kim
2009/0219295 A1 9/2009 Reijnaerts
2009/0251602 A1 10/2009 Williams et al.
2009/0254439 A1 10/2009 Dunn
2009/0256965 A1 10/2009 Moote et al.
2009/0257620 A1 10/2009 Hicks
2009/0260028 A1 10/2009 Dunn et al.
2009/0267866 A1 10/2009 Reddy et al.
2009/0273568 A1 11/2009 Milner
2009/0284457 A1 11/2009 Botzas et al.
2009/0289968 A1 11/2009 Yoshida
2009/0313125 A1 12/2009 Roh et al.
2009/0315867 A1 12/2009 Sakamoto et al.
2009/0319231 A1 12/2009 Beland et al.
2009/0322991 A1 12/2009 Furusawa
2010/0011392 A1* 1/2010 Bronstein .......... H04N 21/4627 725/28
2010/0039440 A1 2/2010 Tanaka et al.
2010/0039696 A1 2/2010 de Groot et al.
2010/0042506 A1 2/2010 Ravenel et al.
2010/0054552 A1 3/2010 Abebe
2010/0060550 A1 3/2010 McGinn et al.
2010/0062844 A1 3/2010 Crowder, Jr. et al.
2010/0066762 A1 3/2010 Yeh et al.
2010/0083305 A1 4/2010 Acharya et al.
2010/0104003 A1 4/2010 Dunn et al.
2010/0109974 A1 5/2010 Dunn et al.
2010/0121693 A1 5/2010 Pacana
2010/0164986 A1 7/2010 Wei et al.
2010/0171889 A1 7/2010 Pantel et al.
2010/0177157 A1 7/2010 Berlage
2010/0177158 A1 7/2010 Walter
2010/0177891 A1* 7/2010 Keidar .................... G06F 21/60 375/E7.026
2010/0188342 A1 7/2010 Dunn
2010/0194861 A1 8/2010 Hoppenstein
2010/0195865 A1 8/2010 Luff
2010/0198983 A1 8/2010 Monroe et al.
2010/0217613 A1 8/2010 Kelly
2010/0223114 A1 9/2010 Yao et al.
2010/0231563 A1 9/2010 Dunn et al.
2010/0242081 A1 9/2010 Dunn et al.
2010/0253613 A1 10/2010 Dunn et al.
2010/0253778 A1 10/2010 Lee et al.
2011/0012856 A1 1/2011 Maxwell et al.
2011/0047567 A1 2/2011 Zigmond et al.
2011/0069018 A1 3/2011 Atkins et al.
2011/0074803 A1 3/2011 Kerofsky
2011/0078536 A1 3/2011 Han et al.
2011/0102630 A1 5/2011 Rukes
2011/0181693 A1 7/2011 Lee et al.
2011/0194730 A1 8/2011 Rhoads et al.
2011/0225859 A1 9/2011 Safavi
2011/0258011 A1 10/2011 Burns et al.
2011/0273482 A1 11/2011 Massart et al.
2012/0075362 A1 3/2012 Ichioka et al.
2012/0147046 A1 6/2012 Chao
2012/0182278 A1 7/2012 Ballestad
2012/0188262 A1 7/2012 Rabii
2012/0203872 A1 8/2012 Luby et al.
2012/0209961 A1* 8/2012 McCoy ................... H04L 65/60 709/219
2012/0233532 A1* 9/2012 Rickabaugh .......... G06F 40/143 715/209
2012/0243727 A1 9/2012 Hwang et al.
2012/0268350 A1 10/2012 Yoshimura
2012/0302343 A1 11/2012 Hurst et al.
2012/0306926 A1 12/2012 Millet et al.
2013/0021524 A1 1/2013 Tang
2013/0103504 A1 4/2013 Srinivasan et al.
2013/0110565 A1 5/2013 Means, Jr. et al.
2013/0132170 A1 5/2013 Yelisetti et al.
2013/0155090 A1 6/2013 Pourbigharaz et al.
2013/0162908 A1 6/2013 Son et al.
2013/0173358 A1 7/2013 Pinkus
2013/0232029 A1 9/2013 Rovik et al.
2013/0307975 A1 11/2013 Ford et al.
2013/0347019 A1 12/2013 Herlein et al.
2014/0043302 A1 2/2014 Barnes
2014/0082646 A1 3/2014 Sandland
2014/0101535 A1 4/2014 Kim et al.

(56) References Cited

U.S. PATENT DOCUMENTS

2014/0114778 A1 4/2014 Miller et al.
2014/0132796 A1 5/2014 Prentice et al.
2014/0136935 A1 5/2014 Santillie et al.
2014/0139116 A1 5/2014 Reed
2014/0152786 A1 6/2014 Nicholson
2014/0160365 A1 6/2014 Kwong et al.
2014/0181528 A1 6/2014 Ram
2014/0184547 A1 7/2014 Tokunaga
2014/0193084 A1 7/2014 Mahinkanda et al.
2014/0214525 A1 7/2014 Tsai et al.
2014/0222578 A1 8/2014 Poornachandran et al.
2014/0236728 A1 8/2014 Wright
2014/0240201 A1 8/2014 Takahashi et al.
2014/0245148 A1 8/2014 Silva et al.
2014/0246982 A1 9/2014 Araki et al.
2014/0253813 A1* 9/2014 Bakar .................. H04W 8/005 348/734
2014/0333541 A1 11/2014 Lee et al.
2014/0361969 A1 12/2014 Wasinger et al.
2014/0375704 A1 12/2014 Bi et al.
2015/0033023 A1 1/2015 Xu et al.
2015/0070340 A1 3/2015 Trachtenberg et al.
2015/0106831 A1 4/2015 Todd
2015/0128076 A1 5/2015 Fang et al.
2015/0172848 A1 6/2015 Gao et al.
2015/0172878 A1 6/2015 Luna
2015/0195626 A1 7/2015 Lee et al.
2015/0227978 A1 8/2015 Woycik et al.
2015/0253937 A1 9/2015 Kim et al.
2015/0281774 A1 10/2015 Atkin
2015/0304593 A1 10/2015 Sakai
2015/0312488 A1 10/2015 Kostrzewa et al.
2015/0382072 A1 12/2015 Lee et al.
2016/0012487 A1 1/2016 Bastaldo-Tsampalis et al.
2016/0014103 A1 1/2016 Masters et al.
2016/0034240 A1 2/2016 Kreiner et al.
2016/0055823 A1 2/2016 Feng et al.
2016/0063954 A1 3/2016 Ryu
2016/0117557 A1 4/2016 Bettagere et al.
2016/0125777 A1 5/2016 Knepper et al.
2016/0134841 A1 5/2016 Round et al.
2016/0198200 A1 7/2016 Choi
2016/0234333 A1 8/2016 Yeh et al.
2016/0284059 A1 9/2016 Gonzalez Solis
2016/0293206 A1 10/2016 Dunn
2016/0300549 A1 10/2016 Zhang
2016/0301972 A1 10/2016 Liu et al.
2016/0335705 A1 11/2016 Williams et al.
2016/0358357 A1 12/2016 Dunn et al.
2016/0371269 A1 12/2016 Pereira et al.
2017/0038846 A1 2/2017 Minnen et al.
2017/0083223 A1 3/2017 Dintrone et al.
2017/0090847 A1 3/2017 Kambhatla
2017/0111486 A1 4/2017 Bowers et al.
2017/0163430 A1 6/2017 Wu et al.
2017/0201797 A1 7/2017 Kwon
2017/0257978 A1 9/2017 Diaz
2017/0278440 A1 9/2017 Dunn et al.
2017/0346584 A1 11/2017 De Laet et al.
2018/0047345 A1 2/2018 Dunn et al.
2018/0332009 A1 11/2018 Lange
2019/0033583 A1* 1/2019 Chauveau ............ G02B 27/144
2019/0034981 A1 1/2019 Basra et al.
2019/0089811 A1* 3/2019 White ..................... H04L 45/16
2019/0113959 A1 4/2019 Lee
2019/0303670 A1 10/2019 Bryden
2020/0004782 A1 1/2020 Pereira et al.
2020/0145721 A1 5/2020 Tapse et al.
2020/0233637 A1 7/2020 Vartakavi et al.
2020/0244951 A1* 7/2020 Holloway .............. H04N 23/54
2020/0404007 A1 12/2020 Singh et al.
2021/0067937 A1 3/2021 Kim et al.
2021/0120307 A1* 4/2021 Bastable ............ H04N 21/4408
2021/0174715 A1 6/2021 Holloway et al.
2022/0132681 A1 4/2022 Dunn et al.
2022/0295666 A1 9/2022 Dunn et al.
2022/0303642 A1* 9/2022 Briercliffe .......... H04N 21/8358
2023/0136695 A1 5/2023 Dunn
2024/0048394 A1* 2/2024 Völcker ................. H04L 9/3073
2024/0089522 A1 3/2024 Ushakov et al.
2024/0220717 A1* 7/2024 Nagargoje ............ G06F 3/0482
2025/0106039 A1* 3/2025 Wuest ................... H04L 9/3247

FOREIGN PATENT DOCUMENTS

EP 0313331 A2 4/1989
EP 0883284 A2 * 12/1998 ........... G06T 1/0021
EP 1640337 A2 3/2006
EP 2401736 A2 1/2012
EP 2744213 A1 6/2014
ID 0514488 A 9/2011
JP 2002064842 A 2/2002
JP 2002209230 A 7/2002
JP 2002366121 A 12/2002
JP 2005236469 A 9/2005
JP 2006184859 A 7/2006
JP 2008034841 A 2/2008
JP 2008165055 A 7/2008
JP 2008-283410 A 11/2008
JP 2009009422 A 1/2009
JP 2011-81197 A 4/2011
JP 2013-195861 A 9/2013
KR 20000021499 A 4/2000
KR 20020072633 A 9/2002
KR 10-2014-0051065 A 4/2014
WO WO9608892 A1 3/1996
WO WO-2004027606 A1 * 4/2004 ............. G06F 16/40
WO WO2006089556 A1 8/2006
WO WO2006111689 A1 10/2006
WO WO2009004574 A1 1/2009
WO WO2011026186 A1 3/2011
WO WO2011035370 A1 3/2011
WO WO2011044640 A1 4/2011
WO WO2011060487 A1 5/2011
WO WO2011143720 A1 11/2011
WO WO2016000546 A1 1/2016
WO WO2016021127 A1 2/2016

OTHER PUBLICATIONS

Analog Devices, ADV212: JPEG 2000 Video Codec, http://www.analog.com/en/audiovideo-products/video-compression/ADV212/products/pr . . . , accessed Oct. 15, 2008, 2 pages.

Analog Devices, Inc., JPEG 2000 Video Codec ADV212, 2006, 44 pages.

Photo Research, Inc., PR-650 SpectraScan Colorimeter, 1999, 2 pages.

Teravision Corp, LCD-TV Panel Control Board Specification, Nov. 2007, 24 pages.

Texas Advanced Optoelectronic Solutions Inc., TCS230 Programmable Color Light-To-Frequency Converter, Dec. 2007, 12 pages.

Texas Advanced Optoelectronic Solutions Inc., TCS3404CS, TCS3414CS Digital Color Light Sensors, Feb. 2009, 38 pages.

Wikipedia, Color rendering index, https://en.wikipedia.org/wiki/Color_rendering_index, accessed Aug. 25, 2016, 13 pages.

Wikipedia, Gamut, https://en.wikipedia.org/wiki/Gamut, accessed Aug. 25, 2016, 8 pages.

Wikipedia, Gradient-index optics, https://en.wikipedia.org/wiki/Gradient-index_optics, accessed Aug. 25, 2016, 5 pages.

Wikipedia, Alpha compositing, https://web.archive.org/web/20080801130026/https://en.wikipedia.org/wiki/Alpha_compositing, from Wikipedia on Aug. 1, 2008, retrieved on Jun. 6, 2018, 4 pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

(56) References Cited

OTHER PUBLICATIONS

Rouaissia, C., Adding Proximity Detection to a Standard Analog-Resistive Touchscreen, SID 2012 Digest, 2012, 1564-1566, p. 132.

* cited by examiner

VIDEO FILES WITH EMBEDDED DIGITAL SIGNATURES FOR DATA SECURITY AND AUTHENTICATION, RELATED SYSTEMS AND METHODS

CROSS-REFERENCE TO RELATED APPLICATIONS

This application claims the benefit of U.S. Provisional Application Ser. No. 63/549,012 filed Feb. 2, 2024, the disclosures of which are hereby incorporated by reference as if fully restated herein.

TECHNICAL FIELD

Exemplary embodiments relate generally to video files with embedded digital signatures for providing data security and authentication, such as at display assemblies, and systems and methods related to the same.

BACKGROUND AND SUMMARY OF THE INVENTION

Digital out-of-home advertising is an increasingly popular medium for advertising and other announcements. Often, such advertising is accomplished using ruggedized electronic display assemblies designed for indoor, outdoor, or semi-outdoor applications. Among other components, these display assemblies may include a video player which is connected electronically to the electronic display to call up various video files for play. Any electronic connection is potentially vulnerable to various data security threats. Inappropriate or otherwise undesirable content might be called up to play on such display assemblies, such as by malicious actors. Therefore, what is needed is a display assembly with data security and authentication features.

A display assembly with data security and authentication features is provided, along with related systems and methods. In exemplary embodiments, a digital signature is embedded into authorized video files. The display assembly checks for the presence of the digital signature in all or some portion of the video frame data of the video or image files being displayed. If the signature is not present, the display assembly does not play the file and instead plays another file, a default image, and/or a blank screen by way of non-limiting example. If the signature is found, the display assembly proceeds to display the image or video. The digital signature may comprise a string of alphanumeric characters which replace all or part of a line of the image file and/or all or part of certain pixels thereof. The portion of the video file replaced may be provided at an area normally obfuscated from view, such as located behind part of a frame or the black mask area of a cover layer. Preferably, the digital signature is embedded utilizing the least significant bit or bits of the first row of pixels. The digital signature file may be created using one or more random character generators, ciphers, encryption techniques, combinations thereof, or the like.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
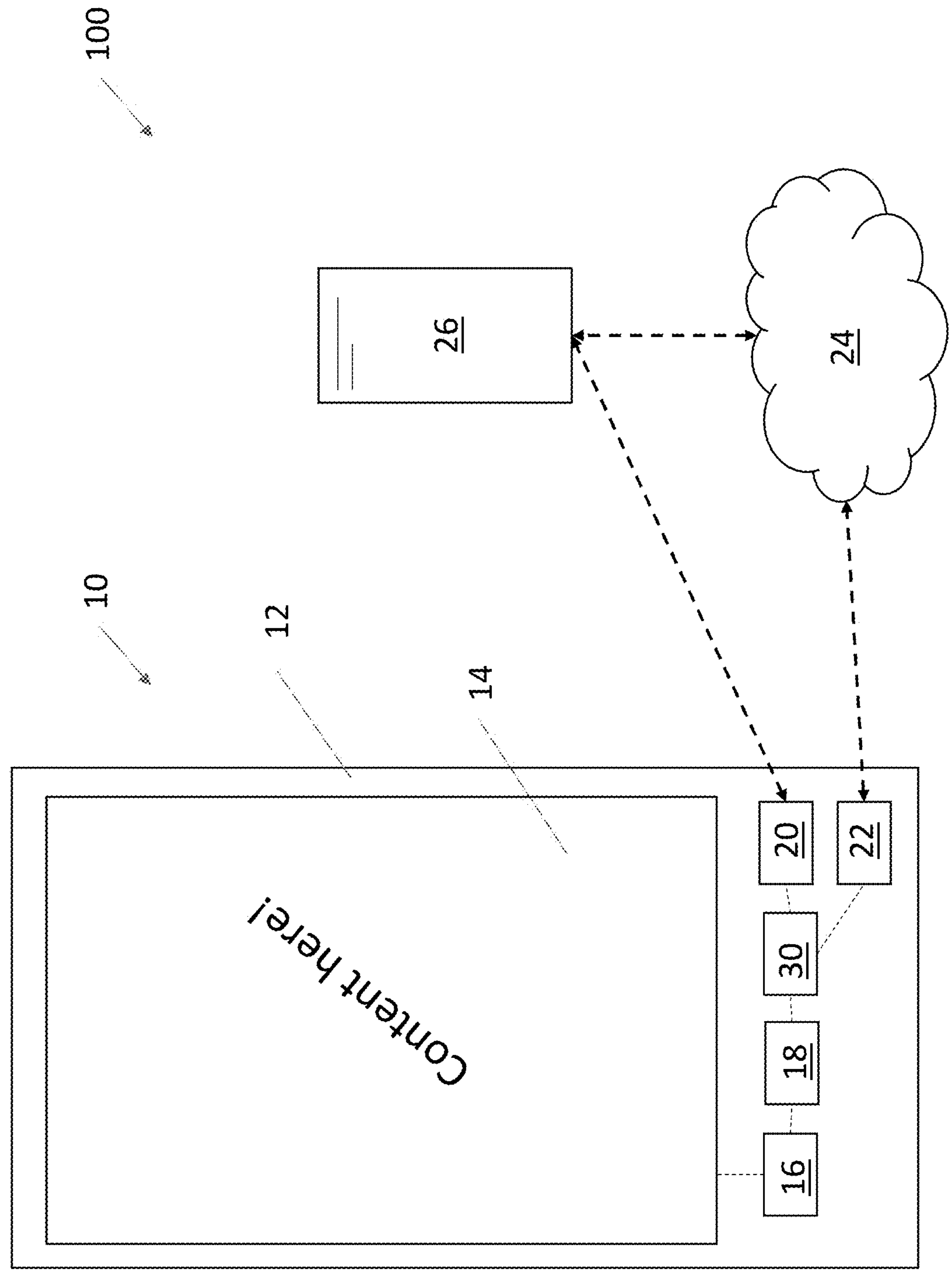
FIG. 1 is a front view of an exemplary display assembly with data security features.
Figure 2:
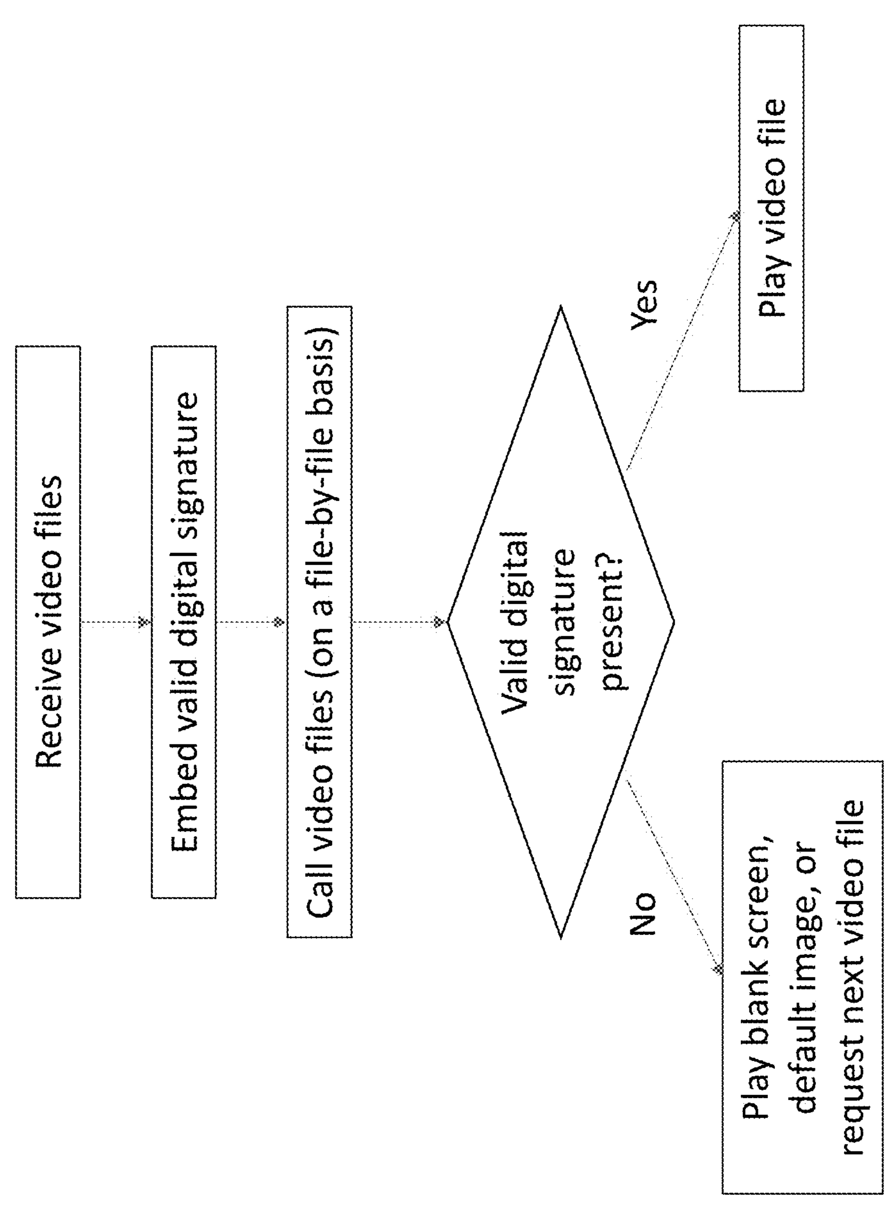
FIG. 2 is a flow chart with exemplary logic for operating the display assembly of FIG. 1.

FIG. 1 illustrates a display assembly 10 with data security and authentication features and related system 100. FIG. 2 provides an exemplary method for operating the same.

The assembly 10 may comprise, by way of non-limiting example, some or all of the units and/or related components available from Manufacturing Resources International, Inc. of Alpharetta, Georgia, shown and/or described in at least US Pub. No. 2022/0132681 published Apr. 28, 2022, and/or shown and/or described in at least US Pub. No. 2023/0136695 published May 4, 2023, the disclosures of each of which are hereby incorporated by reference as if fully restated herein.

The assembly 10 may comprise a structural framework 12, which may comprise one or more members, housings, panels, combinations thereof, or the like. The assembly 10 may comprise one or more electronic displays 14. The electronic displays 14 may comprise liquid crystal type displays, though any type or kind of display may be utilized. Any number and/or arrangement of the electronic displays 14 may be utilized.

The assembly 10 may comprise a processing device 16, such as but not limited to a processor, a field programmable gate array (FPGA), and/or other programmable logic device, in electronic communication with the electronic display 14. A media player 18 may be in electronic communication with the processing device 16. A database 20 may be in electronic communication with the media player 18. Alternatively, or additionally, the media player 18 may be in electronic communication with a network connection device 22.

Video files for playing may be received by local physical connection (e.g., USB drive, etc.) or remote upload from one or more remote devices 26 by way of one or more networks 24 and the network connection device 22. The networks 24 may comprise one or more internets (e.g., worldwide web), intranets, cellular networks, near field communication networks, ad hoc networks, local area networks, combinations thereof, or the like. The remote devices 26 may comprise computers, servers, tablets, smartphones, combinations thereof, or the like. Video files may optionally be stored at the database 20 locally for calling up. Alternatively, or additionally, video files may be streamed by way of the network connection device 22 and the network(s) 24.

A digital signature embedding module 30 may be interposed between the media player 18, the database 20, and the network connection device 22. Alternatively, the digital signature embedding module 30 may be provided as part of the media player 18. Regardless, the digital signature embedding module 30 may be configured to add and/or replace a portion of the video files with a digital signature. Such addition and/or replacement may be provided upon or after receiving the video files. The digital signature may comprise one or more alphanumeric characters, by way of non-limiting example. The digital signature embedding module 30 may be configured to generate the digital signature using one or more cryptographic techniques, random character generators, combinations thereof, or the like. In exemplary embodiments, without limitation, the digital signature embedding module 30 is configured to replace or overlay the data representing the first several pixels, or portions thereof, of received video files with the digital signature. However, any size, location, or the like of the digital signature within the video file may be utilized. In other exemplary embodiments, the digital signature embedding module 30 may be provided at the remote device(s) 26, which may add the digital signature before transmission to the display assembly 10.

Once a video file is called up, the processing device 16 may be configured to check for a presence of the digital signature before displaying the video file at the electronic display 14. For example, without limitation, the processing device 16 may be configured to check a known location of the digital signature within the video file for the digital signature (e.g., the first several pixels). The processing device 16 may be configured to verify the authenticity of the presented digital signature. For example, without limitation, the processing device 16 may be provided with an encryption key, acceptable signature parameters (e.g., number and placement of certain types of characters, inclusion of certain types of characters, combinations thereof, or the like), ciphers, stored acceptable passcodes, combinations thereof, or the like which are used to verify the presented signature.

Where a valid digital signature is present, the processing device 16 may proceed to display the video file at the electronic display 14, or multiple such displays. Where no valid digital signature is found, the processing device 16 may play a blank screen, a default image or video file, and/or request that a next video file in a programming order be provided. The process may be repeated for some, or all, video files presented. The same or similar process may be utilized for displaying static images at the electronic display(s) 14.

The digital signature embedding module 30 may be configured to add or replace a specific, predetermined portion of the video file with a valid digital signature. For example, without limitation, the digital signature embedding module 30 may be configured to add or replace the first several pixels of a respective image/frame of the video file with the digital signature. Other locations may be utilized.

Some, or all, of the displayed images of a given video file may contain the signature. For each video file, only a certain image/frame (e.g., first image/frame, though it could be some other predetermined image/frame such as the second images/frame or so forth) may contain the signature and the processing device 16 may be configured to only check for the presence of a valid digital signature for such images/frames. However, in other exemplary embodiments, without limitation, the digital signature embedding module 30 may be configured to replace all images/frames of a given video file with a valid digital signature and the processing device 16 may be configured to check for the presence of a valid digital signature in all such images/frames. Other combinations may be utilized.

In other exemplary embodiments, without limitation, the processing device 16 may be configured to remove the digital signature data from the video file once determined to be present. For example, without limitation, the signature data may optionally be provided following upload of the video file, and removed once checked by the processing device 16 such that only the image data remains.

Where the signature data is left in the image/video file data such that the signature is displayed as part of the image/video, it is preferably placed at a portion of the image/video not readily or otherwise visible, such as at a portion of the electronic display 14 located behind a mask area and/or blank ink printed area of a cover layer (e.g., glass and/or plastic) positioned forward of, and optionally spaced apart from, a display layer (e.g., LCD layer). The cover layer may be part of the electronic display 14 or separate therefrom.

Where multiple electronic displays 14 are provided, such as at a common assembly 10, some or all components may be provided for each unit 10 and/or shared in common with the electronic displays 14.

The digital signature may be embedded into some or all images of image files, some or all images of video files, etc., such as, but not limited to, the first image only or every image, by way of the digital signature embedding module 30. The processing device 16 may be configured to check for the digital signature at only some or all of the image and/or video file data, such as but not limited to, the first image only or every image, accordingly. While files are sometimes shown or discussed, the same or similar process(es) may be utilized for individual image frames, such as on an image-by-image and/or file-by-file basis.

The digital signature embedding module 30 may be configured to only generate valid digital signatures, e.g., having digital signature data and/or producing digital signatures meeting the validation criteria. These may be referred to candidate digital signatures. The candidate digital signatures may be predetermined. For example, without limitation, a plurality of candidate digital signatures may be stored and used in a cycle. In such embodiments, the processing device 16 may be configured to check for an exact match for each of the digital signatures, such as on a table lookup basis.

Alternatively, or additionally, the candidate digital signatures may be generated, such as on an as-needed basis and/or on-demand, in accordance with one or more validation criteria. For example, without limitation, the digital signature might be required to be a predetermined length, within predetermined length parameters, have certain characters or types of characters, such as in certain locations, be summed or otherwise combined into various values, combinations thereof, or the like. A variety of validation characteristics may be utilized. In such embodiments, the digital signature embedding module 30 may be configured to utilize random number and/or character generators specified to certain characters and/or sizes, utilize algorithms or other logic to only place certain character types at certain locations within the file data, combinations thereof, or the like. In such embodiments, the processing device 16 may be configured to check to see if the provided digital signature matches a predetermined set of criteria. The processing device 16 may comprise algorithms or other logic to check for signatures of a certain size, that have certain characters or types of characters, such as in certain locations, be summed or otherwise combined into various values, combinations thereof, or the like.

The digital signature embedding module 30 and processing device 16 may be provided at each display assembly 10 such that signature embedding and checks are performed locally. In other exemplary embodiments, without limitation, the digital signature embedding module 30 is common to two or more of the display assemblies 10 such that signature embedding is performed centrally. Alternatively, or additionally, the processing device 16 may be common to two or more of the display assemblies 10 such that a signature check is performed centrally. I Preferably, however, at least the processing device 16, if not also the digital signature embedding module 30, is local to each display assembly 10 for enhanced security, such as by placing the check for a valid signature at a location with less exposure to security vulnerabilities.

These techniques may assist with preventing the playing of unauthorized content. This may be particularly important in the world of digital out-of-home advertising, for example, where a large number of such assemblies 10 are generally operated remotely.

The candidate digital signatures may be different for each file, though such is not necessarily required.

While video files are sometimes shown and/or described herein, the disclosed technology may be utilized with regard to static image files, such as a single image which is displayed for a period of time.

The steps shown and/or described herein may be repeated and/or performed in various orders. For example, without limitation, the files may be received on an ongoing basis, the valid digital signatures may be assigned on an ongoing basis, and/or the files may be checked for valid digital signatures on an ongoing basis. These steps may be performed independent of one another, such as on a parallel basis. These steps may be performed as needed and/or on a batch basis, by way of example.

Any embodiment of the present invention may include any of the features of the other embodiments of the present invention. The exemplary embodiments disclosed herein are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectively components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold solely non-transitory signals.

What is claimed is:

1. A display assembly with data security and authentication features, said display assembly comprising:

an electronic display;

a media player; and one or more non-transitory electronic storage devices storing software instructions including a digital signature embedding module, which when executed, configures one or more processing devices to:

insert a respective valid digital signature into media files received at the display assembly, including by replacing a portion of content data of a respective media file with the respective valid digital signature, wherein the valid digital signatures meet predetermined criteria;

check for a valid digital signature at files received from the media player for playing at the electronic display; and if the valid digital signature is found, permit the received file to be displayed at the electronic display.

2. The display assembly of claim 1 wherein:

the media files comprise video files; and the software instructions, when executed, configure the one or more processing devices to:

insert the valid digital signatures on a file-by-file basis; and check for the valid digital signatures on the file-by-file basis.

3. The display assembly of claim 1 wherein:

the media files comprise image files; and the software instructions, when executed configure the one or more processing devices to:

insert the valid digital signatures data on an image-by-image basis; and check for the valid digital signatures on the image-by-image basis.

4. The display assembly of claim 1 wherein:

the predetermined criteria comprise a size, character type, and location.

5. The display assembly of claim 1 wherein:

the software instructions, when executed, configure the one or more processing devices to replace certain pixel data of the media files with the respective valid digital signature as part of replacing the portion of the content data of the respective media file with the respective valid digital signature.

6. The display assembly of claim 5 wherein:

the electronic display comprises a display layer and a cover layer having a mask area; and the certain pixel data corresponds to locations of the display layer obscured by the mask area of the cover layer to a viewer of the electronic display when the media file is played.

7. The display assembly of claim 6 wherein:
the display layer comprises a liquid crystal layer; and
the electronic display comprises a backlight for the liquid crystal layer.

8. The display assembly of claim 1 wherein:
the software instructions, when executed, configure the one or more processing devices to:
select the valid digital signatures are selected-from a plurality of candidate, predetermined digital signatures comporting with the predetermined criteria; and
reuse the plurality of candidate, predetermined digital signatures.

9. The display assembly of claim 1 wherein:
the software instructions, when executed, configure the one or more processing devices to play a blank screen or default file where the valid digital signature is not found.

10. The display assembly of claim 1 wherein:
the software instructions, when executed, configure the one or more processing devices to request a next file where the valid digital signature is not found.

11. The display assembly of claim 1 further comprising:
at least one hardware component which facilitates receipt of the files from one or more remote devices by way of one or more wired and/or wireless network connections; and
a database for storing the files.

12. The display assembly of claim 1 wherein:
the one or more processing devices comprise a programmable logic device comprising a field programmable gate array.

13. A system providing data security and authentication features for display assemblies, said system comprising:
one or more non-transitory electronic storage devices storing software instructions, including a digital signature embedding module, which when executed, configure one or more processors to: insert valid digital signatures into media files for playing at the display assemblies, including by replacing a portion of content data of a respective one of the media files with a respective one of the valid digital signatures, wherein the valid digital signatures meet certain predetermined criteria; and
the display assemblies, each comprising:
an electronic display for displaying content from the media files;
a media player for providing the media files; and
a programmable logic device in electronic communication with the media player and the electronic display, wherein the programmable logic device comprises software instructions, which when executed, configure the programmable logic device to:
check for the valid digital signature in media files received from the media player for playing at the electronic display; and
if a valid digital signature is found, cause the received media file to be displayed the electronic display.

14. The system of claim 13 wherein:
each of the display assemblies comprise the digital signature embedding module.

15. The system of claim 13 wherein:
the display assemblies each comprise at least one hardware component which facilitates receipt of the media files from one or more remote devices by way of one or more wired and/or wireless network connections; and
the one or more remote devices comprise the digital signature embedding module such that the digital signature embedding module is common to each of the display assemblies.

16. The display assembly of claim 13 wherein:
the software instructions, when executed, configure the one or more processing devices to replace certain pixel data of the media files with the valid digital signatures as part of replacing the portion of the media files for display at the display assemblies with the valid digital signatures;
each of the display assemblies comprise a cover layer having a mask area obscuring a portion of the electronic display when viewed; and
the certain pixel data corresponds to a portion of the electronic display behind the mask area.

17. The display assembly of claim 13 wherein:
the digital signature embedding module is configured to generate a different valid digital signature for each of the plurality of media files.

18. A display assembly with data security and authentication features, said display assembly comprising:
an electronic display;
a media player; and
one or more non-transitory electronic storage devices storing software instructions, which when executed, configure one or more processing devices in electronic communication with the media player and the electronic display, to:
retrieve content files for display at the electronic display in accordance with a playlist;
prior to display at the electronic display, check for a valid digital signature at the content files, wherein said valid digital signatures are those which meet predetermined criteria, including having a portion of the content file otherwise representing pixel information for content for display at the electronic display having been replaced with the digital signature;
if the valid digital signature is found, permit the received file to be displayed at the electronic display; and
request a next one of the content files in accordance with the playlist where the valid digital signature is not found.

* * * * *